United States Patent [19]
Yokoyama et al.

[11] Patent Number: 4,767,819
[45] Date of Patent: Aug. 30, 1988

[54] ULTRA-HIGH-MOLECULAR-WEIGHT POLYETHYLENE SOLUTION

[75] Inventors: Shigeki Yokoyama, Yokohama; Michiaki Torii; Kazuo Matsuura, both of Tokyo; Akira Sano, Kawasaki, all of Japan

[73] Assignee: Nippon Petrochemicals Co., Ltd., Japan

[21] Appl. No.: 70,545

[22] Filed: Jul. 7, 1987

[30] Foreign Application Priority Data

Jul. 8, 1986 [JP] Japan ................... 61-160568

[51] Int. Cl.$^4$ ............................................. C08L 23/06
[52] U.S. Cl. ................................. 524/587; 523/310; 525/240
[58] Field of Search .................. 523/310; 524/587; 525/240

[56] References Cited

U.S. PATENT DOCUMENTS 4,413,110 11/1983 Kauesh ............................ 524/108
4,422,993 12/1983 Smith ............................. 526/348.1
4,487,875 12/1984 Nakajima ......................... 524/587

Primary Examiner—Joseph L. Schofer
Assistant Examiner—Peter D. Mulcahy
Attorney, Agent, or Firm—Ostrolenk, Faber, Gerb & Soffen

[57] ABSTRACT

The present invention provides an ultra-high-molecular-weight polyethylene solution which is produced by the steps of subjecting a kerosene fraction having a boiling point of 160° to 300° C. to a nucleus hydrogenation treatment at a pressure of 30 to 100 kg/cm$^2$ at a temperature of 100° to 300° C. in the presence of a metallic catalyst for nucleus hydrogenation of aromatic nuclei; separating and removing at least a part of n-paraffins present in the kerosene therefrom by the use of a molecular sieve made up of a synthesized zeolite in order to obtain a residual oil; fractionating the latter by a rectification apparatus to obtain a hydrocarbon mixture fraction which has a boiling point of 180° to 250° C. and which is substantially free from naphthalene and biphenyl; and dissolving, in the hydrocarbon mixture fraction, an ultra-high-molecular-weight polyethylene having an intrinsic viscosity of 8 or more in decalin at 135° C.

4 Claims, No Drawings

ULTRA-HIGH-MOLECULAR-WEIGHT POLYETHYLENE SOLUTION

BACKGROUND OF THE INVENTION (1) Field of the Invention

The present invention relates to a solution for the preparation of a spinning original dope which is used to manufacture polyethylene fibers, films and the like having a high strength and a high modulus of elasticity. In particular, it relates to a concentrated and uniform solution of an ultra-high-molecular-weight polyethylene.

(2) Description of the Prior Art

A so-called ultra-high-molecular-weight polyethylene having an intrinsic viscosity [η] of 8 or more in a decalin at 135° C. and having as noticeably high a molecular weight as about one million or more is utilized as an engineering plastic which can be characterized by excellent shock resistance and wear resistance as well as high self-lubricating properties. Therefore, the ultra-high-molecular-weight polyethylene is now used in the forms of hoppers, silos, various gears, lining materials, ski beacking materials and the like in many fields of food machines, civil engineering machines, chemical machines, agriculture, mining, sports/leisure and the like.

The ultra-high-molecular-weight polyethylene has a high molecular weight as compared with prevalent or conventional polyethylenes. In consequence, if a high orientation of the ultra-high-molecular-weight polyethylene is achieved, a stretched product having a higher strength and elasticity than ever can be procured. That is the reason why much attention is now paid to a variety of investigations on the technique of the above-mentioned high orientation. However, the ultra-high-molecular-weight polyethylene has a much higher melting viscosity than prevalent polyethylenes, and therefore it can scarcely be melt-extruded in a usual manner in a molding process and it also is impossible at present to achieve the high orientation by stretching.

On the other hand, Pole Smith, Pieta Yang Lemstra et al have suggested a method for preparing fibers having a high strength and a high modulus of elasticity by stretching, in a high magnification, a gel which had been obtained from a decalin dope of an ultra-high-molecular-weight polyethylene (U.S. Pat. Nos. 4,422,993 and 4,430,383). In this dope, a polymer of $1.5 \times 10^6$ weight-average molecular weight is present at a concentration of 3 wt % and that of $4 \times 10^6$ weight-average molecular weight is present at an extremely low concentration of 1 wt %. In the practice of the suggested technique, therefore, there is the problem that a great deal of solvent must be treated, economic problems and others. For this reason, a highly concentrated solution of the ultra-high-molecular-weight polyethylene is desired and demanded. As solvents which are useful for the preparation of the ultra-high-molecular-weight polyethylene solution, there have been suggested xylene, decalin, o-dichlorogenzene, trichlorobenzene and the like, as disclosed in U.S. Pat. Nos. 4,413,110, 4,422,993, 4,430,383 and 4,536,536 and European Pat. No. 139141, but they are not sufficient. Further, in order to prepare a more concentrated solution, a method of irradiating ultrasonic wave and a method of concentrating its dilute solution have been suggested, but in both of such methods, molecular chains tend to be cut. It is fair to say that the aforesaid methods are not preferable for the purpose that properties inherent in the ultra-high-molecular-weight polyethylene are elicited therefrom by the subsequent molding process.

As is definite from the above, it is never easy to prepare a uniform dope to be molded in a manner of dissolving the ultra-high-molecular-weight polyethylene in a solvent, which fact prevents the application of the above suggested process on an industrial scale.

In addition thereto, there is a method in Japanese Patent Provisional Publication No. 136820/1983 in which a double cylinder is employed to prepare fibers from an ultra-high-molecular-weight polyethylene solution. In this disclosed method, the ultra-high-molecular-weight polyethylene solution is placed in the double cylinder, and an inside cylinder is rotated at a high speed, while the solution is maintained at such a high temperature as not to crystallize by itself. In this case, when a fine yarn is brought into contact with the surface of the inside cylinder, the yarn functions as a seed for crystallization, so that a fibrous ultra-high-molecular-weight polyethylene crystal grows under the rotation of the cylinder. When the seed is drawn out from the system in compliance with the growth of the polyethylene crystal, a continuous fiber can be manufactured. Also in this method, it is crucial for its success to select a suitable solvent for dissolving the ultra-high-molecular-weight polyethylene therein.

SUMMARY OF THE INVENTION

In view of the above situation, the inventors of the present application have reseached intensively to solve these problems, and as a result, they have found that if a solution of an ultra-high-molecular-weight polyethylene in a specific solvent is used, a product solution will be obtained which can be processed with extreme ease and which have excellent physical properties. In consequence, the present invention has been completed.

That is, according to the present invention, there is provided an ultra-high-molecular-weight polyethylene solution which is produced by the steps of subjecting a kerosene fraction having a boiling point of 160° to 300° C. to a nucleus hydrogenation treatment at a pressure of 30 to 100 kg/cm² at a temperature of 100° to 300° C. in the presence of a metallic catalyst for nucleus hydrogenation of aromatic nuclei; separating and removing at least a part of n-paraffins present in the kerosene therefrom by the use of a molecular sieve made up of a synthesized zeolite in order to obtain a residual oil; fractionating the latter by a rectification apparatus to obtain a hydrocarbon mixture fraction which has a boiling point of 180° to 250° C. and which is substantially free from naphthalene and biphenyl; and dissolving, in the hydrocarbon mixture fraction, an ultra-high-molecular-weight polyethylene having an intrinsic viscosity of 8 or more in decalin at 135° C.

Now, the present invention will be described in detail.

In the present invention, a kerosene fraction having a boiling point of 160° to 300° C. is hydrogenated with the aid of a metallic catalyst for nucleus hydrogenation of an aromatic nuclei. As this kind of catalyst, any of known metallic catalysts for the hydrogenation of the aromatic nuclei can be preferably used. Examples of the catalysts which can be preferably used in the present invention include nickel, nickel oxide, nickel/diatomaceous earth, Raney nickel, nickel/copper, platinum, platinum oxide, platinum/activated carbon, platinum/rhodium, platinum/alumina, platinum/lithium/alumina, rhodium/activated carbon, palladium, cobalt, Raney cobalt, ruthenium, tungsten sulfide/nickel sulfide/alumina and cobalt/molybdenum. The pressure used in the present invention is within the range of 30 to 100 kg/cm$^2$ and the temperature is within the range of 100° to 300° C. When the pressure is lower than 30 kg/cm$^2$, or when the temperature is lower than 100° C., the hydrogenation does not progress sufficiently. Inversely, both a higher pressure than 100 kg/cm$^2$ and a higher temperature than 300° C. are unsuitable, because a secondary reaction such as a decomposition predominates. A period of time necessary for the hydrogenation can be suitably decided. For example, LHSV is usually within the range of 0.01 to 100. With regard to the reaction system, either of a batch system and a continuous/flow system can be taken.

The aromatic hydrocarbon is nucleus-hydrogenated to naphthenes by means of the hydrogenation treatment, but a degree of the hydrogenation can be optionally decided in compliance with the above-mentioned catalyst, reaction conditions and the like. Further, the hydrogenation treatment is often accompanied by secondary reactions such as decomposition, isomerization and the like, so that products formed through these secondary reactions are also inevitably contained in the kerosene fraction.

Subsequently to the above-mentioned hydrogenation treatment, a molecular sieve made up of a synthesized zeolite having an average 5 Å pore size is used to separate and remove at least a part of n-paraffins in the kerosene fraction therefrom, thereby obtaining a residual oil.

The method for separating and obtaining n-paraffins from a hydrocarbon mixture by repeating adsorption and desorption in a gaseous or a liquid phase with the aid of a molecular sieve has been heretofore used industrially extensively as a manufacturing method of n-paraffins.

That is, there are the Molex process comprising the steps of using, as a fixed bed, a molecular sieve made up of a synthesized zeolite having many pores of 5 Å and carrying out adsorption and desorption of n-paraffins alternately in a liquid phase, washing the molecular sieve, on which the n-paraffins are adsorbed, with a low-molecular paraffin for desorption in order to desorb the n-paraffins, and separating the joined low-molecular paraffin therefrom by distillation and recycling it, the TSF process (Texaco Selective Finishing Process) comprising the steps of adsorbing n-paraffins in a gaseous phase by the utilization of adsorption/desorption with the aid of a molecular sieve made up of a synthesized zeolite having similar 5 Å pores, and carrying out the desorption of the n-paraffins by washing out them with a low-molecular paraffin; the Isosieve process in which a molecular sieve made up of a similar synthesized zeolite having 5 Å pores is used but in which adsorption/desorption of n-paraffins onto the molecular sieve is carried out by repeating application and release of a pressure alternately; and the Esso process involving a vapor phase/liquid bed process, the Esso process comprising the steps of adsorbing n-paraffins continuously by a molecular sieve of a synthesized zeolite having 5 Å pores on a liquid bed in an adsorbing apparatus, desorbing the n-paraffins therefrom at a higher temperature than that of the adsorption step in a recovery device, and returning the recovered molecular sieve from the recovery device to an adsorption device so as to reuse the molecular sieve.

The n-paraffins can be separated by any of these methods using the molecular sieve which is made up of a synthesized zeolite having average 5 Å pores.

In the processes for separating n-paraffins, the n-paraffins alone ought to be separated theoretically, but in a chosen process, hydrocarbons other than the n-paraffins are separated together with the latter, so that the content of components other than the n-paraffins in the obtained residual oil is liable to change. Taking this point into consideration, a urea adduct process using crystalline urea is also effective as a method for separating n-paraffins on an industrial scale. With regard to the present invention, however, it is proper to made use of the molecular seive made up of the synthesized zeolite.

In such a manner as described above, the n-paraffins are separated from the hydrogenated kerosene fraction in order to obtain a residual oil.

Next, the residual oil is subjected to a rectification. In the latter process, for example, a rectification apparatus comprising two or more distillation columns is used, and light hydrocarbons are removed from the top of a first column of the apparatus and a desired fraction is taken out from the top of a second column or the tops of the subsequent columns. Of course, if a separation efficiency based on the number of distillation steps therein and the like is proper, the light and heavy hydrocarbons are removed respectively from top and bottom of the rectification apparatus comprising one distillation column, and the desired fraction is taken out from the middle portion of the column.

The above-mentioned rectification apparatus permits obtaining the hydrocarbon mixture fraction having a boiling point of 180° to 250° C.

In the fraction of the present invention, naphthenes and isoparaffins are present as main components, but there are scarcely contained benzene, toluene, xylene, naphthalene and biphenyl. Therefore, the thus obtained fraction is preferable from the viewpoints of toxicity, safety, dissolving power to an ultra-high-molecular-weight polyethylene and the like, and the isoparaffins present in the fraction contribute to repressing a peculiar smell of the naphthenes.

The ultra-high-molecular-weight polyethylene has an extraordinarily greater molecular weight compared to the usual molecular weight polyethylene, and therefore a twining or entangling state of its molecular chains is also incomparably more intricate than that of the usual molecular weight polyethylene. In a molding method of an ultra-high-molecular-weight polyethylene solution, it is considered to be an essential process that the twining degree of the molecule is lowered by liquefaction. With regard to the hydrocarbon mixture fraction of the present invention, the twined ultra-high-molecular-weight polyethylene is disentangled suitably by interactions of the respective components of the fraction which are existent in proper contents, though its reason is not elucidated yet in detail. As a result, the concentrated ultra-high-molecular weight polyethylene solution is prepared, and articles molded therefrom also are excellent in physical properties. In view of the fact that a synergistic effect of the respective components in the hydrocarbon mixture fraction of the present invention can be expected, it is necessary that the boiling point of the fraction of the present invention is within the above-mentioned range. The deviation of the boiling point from the range means that the existent components and their contents are unbalanced. When the melting point is lower than 180° C., the vapor pressure of the fraction is too high. In such a case, a pressureresistant container is required, and at the time of dissolving, the vapor (gas) of the fraction tends to go into the melted polyethylene, which fact will be the cause of an unpreferable yarn cutting phenomenon in the stretching step because of voids formed in the yarns. To the contrary, when the melting point is higher than 250° C., the drying step takes a longer time and requires a heating operation, and it is difficult to remove the solvent.

In order to prepare an ultra-high-molecular-weight polyethylene solution having an intrinsic viscosity of 8 or more in decalin at 135° C. by the use of the above-mentioned hydrocarbon mixture fraction, the known conventional heating technique can be employed.

For example, there is a method in which a polyethylene is merely dissolved by heating up to a temperature higher than its melting point, a method similar to the above method but involving the irradiation of ultrasonic wave, and a method of concentrating a previously prepared dilute solution to a more concentrated solution. In addition, another method has been suggested in which for the control of swelling, grains of an ultra-high-molecular-weight polyethylene are subjected to a wetting treatment by the use of a small amount of a low-boiling solvent and the same kind of solvent which has been heated up to a high temperature with moderate stirring is then added thereto. Such a method can provide the solution in which the concentration of the ultra-high-molecular weight polyethylene is as high as 50 wt %.

Judging from the fact that the solution of the present invention will be molded, the present invention does not intend to prepare an extremely highly concentrated solution. In reality, the concentration of the polymer in the solution should be decided, taking into consideration, the moldability of the solution and the performance of fibers and films which will be made therefrom. Consequently, in the present invention, an appropriate concentration of the polymer in the solution is within the range of about 0.001 wt % to about 50 wt %, preferably about 0.01 wt % to 30 wt %.

The molding of this solution may be carried out by first causing it to gel or by using a double cylinder as mentioned above, and then fibers or films of the ultra-high-moleuclar-weight polymethylene may be obtained.

In the case of molding the solution of the present invention, a method is suitable in which the first prepared solution is cooled to gel.

When cooled, the polyethylene solution can solidify and gel without any precipitation of the polyethylene and without any phase separation in the macroscopic meaning, with the volume of the solution maintained. However, this phenomenon can be achieved only by properly selecting the kind of solvent and its concentration. Hower, in the present invention, there are always formed physical linking points in a gel which result from the formation of fine crystals by partial crystallization in molecular chains of the ultra-high-molecular weight polyethylene because of good interactions between the respective components in the fraction and polyethylene molecules, whereby the solution using the fraction of the present invention can be changed into the gel having a good three-dimensional network on the level of the molecular size.

When gel films are desired, they may be prepared by casting the solution in a suitable manner, or alternatively by extruding the solution through a slit of a T-die, followed by cooling. On the other hand, gel fibers may be manufactured by a so-called wet spinning process. That is, a suitable anti-oxidant, if necessary, may be added to the solution, and the latter may be then forced to go through nozzles each having a suitable diameter by the use of a usual gear pump and may be guided into water so as to cool it, so that the desired gel fibers can be obtained. The thus obtained gel is stable insofar as it is preserved in a medium such as water, and therefore the gel can be prevented from being crystallized and hence extrude a solvent therefrom.

The fiber gel or the film gel is then subjected to a solvent removal treatment, a drying treatment and a stretching treatment. The stretching before solvent removal may be possible. The latter stretching treatment may be carried out at a suitably elevated temperature. Therefore, instead of a sequence of the above-mentioned treatments, the solvent removal and drying treatments may be carried out simultaneously together with the stretching treatment in the stretching process. In the latter process, a temperature level, a take-up rate, a stretching magnification and the like may be chosen suitably.

When the solution of the present invention and the gel prepared therefrom are used, the following effects can be obtained:

(a) Since the solution of the present invention is excellent in dissolving power to an ultra-high-molecular weight polyethylene, fibers and films having a high strength and a high modulus of elasticity can be manufactured very stably by stretching its gel.

(b) The high dissolving power to the ultra-high-molecular weight polyethylene permits producing the uniform and highly concentrated solution in which molecular chains of the ultra-high-molecular weight polyethylene are sufficiently disentangled, and therefore fibers, films and the like can be manufactured at an extremely low cost by stretching its gel.

(c) The present invention can provide a highly concentrated and uniform ultra-high-molecular weight polyethylene solution and its gel without using any ad hoc dissolver and any dissolving technique, and fibers and films having a high strength and a high modulus of elasticity can be stably and economically manufactured by stretching the gel.

EXAMPLES

Now, the present invention will be described in detail in accordance with examples, but its modifications and alterations should not be limited to these examples.

In this specification, temperatures are all represented by centigrade, and parts and percents are all on the basis of weight, unless otherwise specified.

Solvent Preparation 1

A kerosene fraction (which was composed of 65 wt % of paraffins, 25 wt % of naphthenes and 10 wt % of aromatic hydrocarbons) having a boiling point of 150° to 280° C. which had been obtained by the distillation of a crude oil was hydrogenated under conditions of 280° C. and 90 kg/cm$^2$ by the use of a nickel-tungsten catalyst for hydrogenation of aromatic nuclei. The resulting product was then fed into a separating column packed with a molecular sieve made up of a synthesized zeolite and having average pores of 5 Å, and n-paraffins were removed out therefrom in accordance with the Molex process. The fraction in which the n-paraffins had been diminished was subjected to a rectification in a twotower rectification apparatus in order to obtain a hydrocarbon mixture fraction, i.e, a solvent having a boiling point of 185° to 226° C. The composition and properties of this solvent are set forth in Table 1.

Solvent Preparation 2

The same prodcedure as in Example 1 was repeated with the exception that a kerosene fraction having different properties than in Example 1 was used, in order to obtain a solvent. The composition and properties of the solvent are set forth in Table 1.

EXAMPLE 1

A small amount of an antioxidant was added to the fraction of Solvent Preparation 1, and a polyethylene having an intrinsic viscosity of 16.0 in decalin at 135° C. was further added thereto and then dissolved therein by stirring at 140° C. for 3 hours in order to obtain a 10 wt % ultra-high-molecular-weight polyethylene solution. In this solution, undissolved and cohered particles were not observed, and nothing adhered onto the side walls and the bottom of a vessel. Next, gel fibers containing a solvent were spun out of this solution at 130° C. by the use of a spinning die each spinning nozzle of which had a diameter of 1.0 mm. During this period of time, neither yarn cutting nor yarn irregularity did occur, which fact was indicative that the solution in this example was a uniform spinning original dope.

Afterward, the gel fibers were passed through a pipe-like oven heated to 120° C. in order to stretch them 30-fold. The modulus of elasticity and strength of the fibers are set forth in Table 2.

COMPARATIVE EXAMPLE 1

The same procedure as in Example 1 was repeated with the exception that decalin was substituted for the mixed solvent of the present invention. In the resulting 10 wt % decalin solution, large gel particles were present, and therefor a uniform solution could not be prepared. When a spinning test was made for this solution, yarn cutting often occurred, and therefore spinning was impossible.

COMPARATIVE EXAMPLE 2

Following the same procedure as in Comparative Example 1, a 5 wt % decaline solution was prepared. A spinning test was given, but spinning was unstable and yarn irregularity occurred. Eventually, the modulus of elasticity and strength were at low levels, as shown in Table 2.

EXAMPLE 2

A spinning test was made in the same manner as in Example 1 with the exception that the mixed solvent of Solvent Preparation 2 was substituted. Spinning could be stably accomplished. The modulus of elasticity and strength are shown in Table 2.

TABLE 1

| | Preparation Example of Solvent | |
|---|---|---|
| | 1 | 2 |
| Composition (wt %): | | |
| Naphthenes | 68 | 57 |
| Isoparaffins | 21 | 24 |
| Others | 11 | 19 |
| Compounds (wt %) to Which Regulations are Applied: | | |
| Benzene, Toluene and Xylene | 0 | 0 |
| Naphthalene | 0 | 0 |
| Biphenyl | 0 | 0 |
| Properties: | | |
| Specific Gravity (15/4) | 0.817 | 0.821 |
| Flash Point (°C.) | 60 | 85 |
| Viscosity (cSt) (40° C.) | 1.34 | 1.81 |

TABLE 2

| | Boiling Point of Solvent °C. | Conc. of Polymer in Sol. (wt %) | Modulus of Elasticity (g/d) | Strength (g/d) |
|---|---|---|---|---|
| Example 1 | 185 to 226 | 10 | 987 | 30.1 |
| Example 2 | 216 to 241 | 10 | 979 | 30.0 |
| Comp. Ex. 1 | 187 to 196 | 10 | * | * |
| Comp. Ex. 2 | 187 to 196 | 5 | 200 | 14.1 |

*It could not be measured.

What is claimed is:

1. An ultra-high-molecular-weight polyethylene solution which is produced by the steps of subjecting a kerosene fraction having a boiling point of 160°0 to 300° C. to a nucleus hydrogenation treatment at a pressure of 30 to 100 kg/cm$^2$ at a temperature of 100° to 300° C. in the presence of a metallic catalyst for nucleus hydrogenation of aromatic nuclei; separating and removing at least a part of n-paraffins present in said kerosene therefrom by the use of a molecular sieve made up of a synthesized zeolite in order to obtain a residual oil; fractionating the latter by a rectification apparatus to obtain a hydrocarbon mixture fraction which has a boiling point of 180° to 250° C. and which is substantially free from naphthalene and biphenyl; and dissolving, in said hydrocarbon mixture fraction, an ultra-high-molecular-weight polyethylene having an intrinsic viscosity of 8 or more in decalin at 135° C.

2. An ultra-high-molecular-weight polyethylene solution according to claim 1 wherein said ultra-high-molecular-weight polyethylene is dissolved at a concetration of 50 wt % or less.

3. An ultra-high-molecular-weight polyethylene solution according to claim 1 wherein said metals are selected from the group consisting of nickel, copper, cobalt, tungsten, molybdenum, platinum, rhodium, palladium and ruthenium.

4. An ultra-high-molecular-weight polyethylene gel which is produced from the ultra-high-molecular-weight polyethylene solution according to claim 1.

* * * * *